Patented Aug. 10, 1948

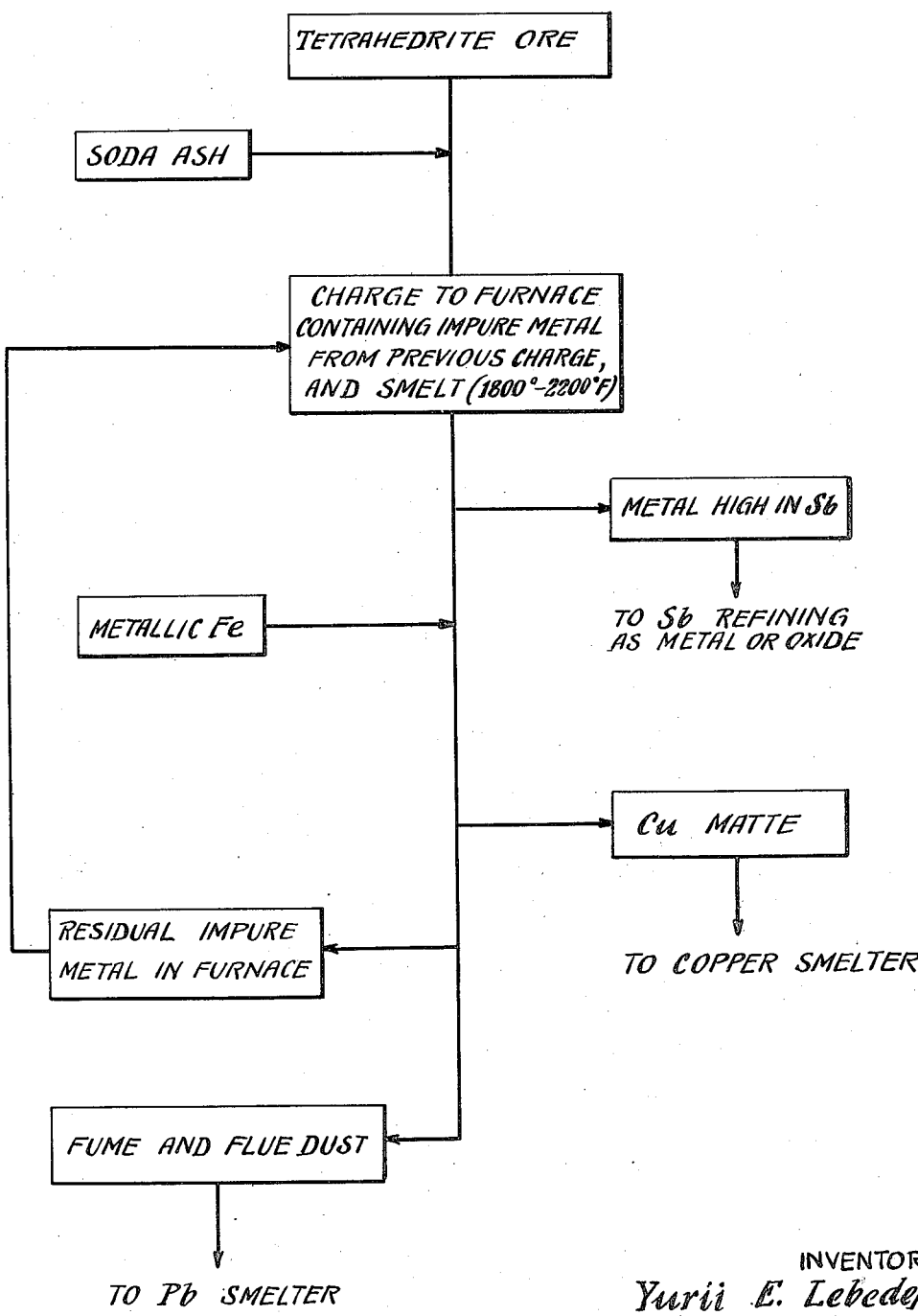

2,446,656

UNITED STATES PATENT OFFICE 2,446,656

PYROMETALLURGICAL TREATMENT OF TETRAHEDRITE ORES

Yurii E. Lebedeff, Metuchen, and Harold H. Monson, Avenel, N. J., assignors to American Smelting and Refining Company, New York, N. Y., a corporation of New Jersey Application January 18, 1946, Serial No. 642,021

3 Claims. (Cl. 75—21)

1

This invention relates to the art of treating tetrahedrite ores.

It is an object of the invention to provide a pyrometallurgical process for treating tetrahedrtie ores to concentrate the antimony and copper contents thereof in forms from which these values may be readily recovered. Other objects and advantages of the invention will be apparent from the following description.

The drawing, accompanying and forming a part of this specification, is a flow sheet illustrating the process of the invention.

In accordance with the invention, the tetrahedrite ore is mixed with soda ash, charged to a suitable furnace and smelted. Metallic iron, e. g., scrap iron or mild steel, is charged to the furnace and thoroughly incorporated in the melt thereby forming a matte in which copper is concentrated. Upon removal of such matte, there remains a residual impure metal containing the bulk of the antimony together with some copper.

A further quantity of tetrahedrite ore and soda ash mixture is charged to the furnace containing the residual impure metal, the ore being rabbled to bring about the displacement of antimony in the tetrahedrite ore, by the copper constituent of the impure antimony metal, resulting in the copper being concentrated in the matte which is appropriately tapped leaving a residual metal high in antimony and low in copper. At suitable intervals, during the above cycle of operations, the high antimony metal is tapped from the system and may be refined to yield metallic antimony or antimony oxide, as desired.

The amount of iron required for the process generally ranges between 10% and 12% by weight of the tetrahedrite charged, the iron additions being appropriately adjusted in each case to effectively clean the matte of antimony without undue precipitation of copper.

The following examples will serve to illustrate the results that may be expected from the use of the new process.

Example 1

To a ton of tetrahedrite ore containing 17% Sb, 29.2% Cu, 354.7 oz./T. Doré and 14.2% Fe, there is added 300 lbs. of soda ash, and the mixture charged to a furnace containing residual impure metal from a previous charge. Upon smelting at a temperature approximating 1800°–2200° F., there is tapped 319 lbs. of metal analyzing 80% Sb, 10% Cu, 0.6% Fe and 900 oz./T. Doré. Next, 240 lbs. of scrap iron is incorporated and dissolved in the melt, following which there is tapped 2043 lbs. of matte containing 27% Cu, 2.5% Sb, 25.6% Fe and 206.4 oz./T. Doré. Fume and dust produced totals 68 lbs. analyzing 50% Sb, 0.5% Cu and 10 oz./T. Doré. A residual impure Cu-Sb metal remains in the furnace for treatment with the next charge of tetrahedrite and soda ash.

Example 2

This example represents the aggregate result obtained by treating eleven equal charges of 150 parts by weight each of ore, in accordance with the process of the invention.

The tetrahedrite concentrate, amounting to 1650 parts by weight contains 16.3% Sb, 27.3% Cu and 398.8 oz./T. Ag. The soda ash admixed thereto amounted to 242 parts by weight and the antimony metal tapped, following the smelting operation, totaled 263 parts by weight analyzing 70.4% Sb, 11.2% Cu and 798 oz./T. Ag. The scrap iron rabbled into the melt following removal of the antimony metal amounted to 172 parts by weight. The copper matte and slag tapped from the residual impure Cu-Sb metal in the furnace, consisted of 1139 parts by weight of matte analyzing 24.9% Cu, 1.7% Sb and 235 oz./T. Ag and 147 parts by weight of slag analyzing 11% Cu, 5.8 Sb and 161 oz./T. Ag. Fume amounted to 22 lbs. analyzing 38% Sb, 5% Cu and 145.2 oz./T. Ag.

It will be apparent from the foregoing that the present invention provides a simple pyrometallurgical process for treating tetrahedrite ore to obtain a metal containing the bulk of the antimony and a matte product containing the bulk of the copper, both products being readily amenable to further treatment for recovery of their predominant metal values.

What is claimed is:

1. A pyrometallurgical method for the treatment of tetrahedrite ores which comprises smelting a charge comprising tetrahedrite ore and soda ash, rabbling metallic iron into the melt, tapping matte containing the bulk of the copper, smelting a further quantity of such a charge with the remaining melt, and tapping a metal containing the bulk of the antimony.

2. The process for treating tetrahedrite ores which comprises charging such ore together with soda ash to a furnace containing residual impure metal from a preceding charge, smelting same at a temperature approximating 1800°–2200° F., tapping metal high in antimony from the furnace, charging metallic iron to the furnace and incorporating it in the melt, tapping the resulting copper matte from the furnace leaving a residual impure metal therein, and charging additional tetrahedrite ore and soda ash to the furnace.

3. The process for treating tetrahedrite ores which comprises forming a charge by mixing such ore with soda ash, charging the mixture to a furnace containing impure metal from a previous charge and smelting same therein, tapping metal high in antimony from the furnace, charging metallic iron to the melt remaining in the furnace, tapping copper matte from the furnace leaving a residual impure metal therein, and charging further quantities of tetrahedrite and soda ash thereto.

YURII E. LEBEDEFF.
HAROLD H. MONSON.

REFERENCES CITED

The following references are of record in the file of this patent:

UNITED STATES PATENTS

| Number | Name | Date |
|---|---|---|
| 575,467 | Ellershausen | Jan. 19, 1897 |
| 805,835 | Baggaley | Nov. 28, 1905 |
| 921,372 | Divine | May 11, 1909 |
| 2,325,176 | Deitz, Jr. | July 27, 1943 |